United States Patent
Lindsay et al.

(10) Patent No.: US 6,964,723 B2
(45) Date of Patent: Nov. 15, 2005

(54) METHOD FOR APPLYING PRESSURE TO COMPOSITE LAMINATE AREAS MASKED BY SECONDARY FEATURES

(75) Inventors: William E. Lindsay, Mesa, AZ (US); John R. Peeler, Mesa, AZ (US)

(73) Assignee: The Boeing Company, Chicago, IL (US)

(*) Notice: Subject to any disclaimer, the term of this patent is extended or adjusted under 35 U.S.C. 154(b) by 432 days.

(21) Appl. No.: 10/264,654

(22) Filed: Oct. 4, 2002

(65) Prior Publication Data

US 2004/0065409 A1 Apr. 8, 2004

(51) Int. Cl.$^7$ .............................................. B29C 65/00
(52) U.S. Cl. ................... 156/285; 156/305; 156/91; 156/92; 156/73.3; 156/73.1; 156/306.6; 52/729.1; 52/729.2; 52/729.3; 52/729.4; 52/729.5; 52/745.19; 244/119; 244/125; 244/126; 244/127; 244/128; 244/131; 244/132; 428/119; 428/120
(58) Field of Search ........................... 156/285, 148, 156/73.3, 73.1, 306.6, 91, 92; 52/729.1, 729.2, 729.3, 729.4, 729.5, 745.19; 428/223, 102, 119, 120; 244/125–128

(56) References Cited

U.S. PATENT DOCUMENTS

| | | | | |
|---|---|---|---|---|
| 4,657,717 A | | 4/1987 | Cattanach | |
| 4,734,146 A | * | 3/1988 | Halcomb et al. | 156/148 |
| 4,786,343 A | * | 11/1988 | Hertzberg | 156/93 |
| 5,593,633 A | * | 1/1997 | Dull et al. | 264/510 |
| 5,817,269 A | | 10/1998 | Younie | |
| 5,935,698 A | * | 8/1999 | Pannell | 428/223 |
| 5,980,665 A | * | 11/1999 | Childress | 156/92 |
| 6,017,484 A | | 1/2000 | Hale | |
| 6,520,706 B1 | * | 2/2003 | McKague et al. | 403/265 |
| 6,709,538 B2 | * | 3/2004 | George et al. | 156/73.3 |
| 6,718,713 B2 | * | 4/2004 | McKague et al. | 52/309.13 |

* cited by examiner

Primary Examiner—Jeff H. Aftergut
Assistant Examiner—Chris Schatz
(74) Attorney, Agent, or Firm—Shimokaji & Associates, P.C.

(57) ABSTRACT

A method for applying pressure to the area of a composite part masked by a secondary feature comprises the steps of positioning a pressure augmentation strip in contact with the masked area, securing a pressure transfer wedge on each of two sides of the secondary feature, such that pressure is transferred to the pressure augmentation strip during co-curing/co-bonding, and co-curing/co-bonding the composite part and the secondary feature. When the area between the composite part and the secondary feature is fairly large, the method can comprise the further steps of positioning a sine wave spring between the pressure augmentation strip and the secondary feature, injecting a structural paste adhesive into the voids around the sine wave spring, and curing the structural paste.

31 Claims, 9 Drawing Sheets

METHOD FOR APPLYING PRESSURE TO COMPOSITE LAMINATE AREAS MASKED BY SECONDARY FEATURES

GOVERNMENT RIGHTS

The invention was made with Government support under a contract awarded by Army Aviation Technical Directorate. The Government has certain rights in this invention.

BACKGROUND OF THE INVENTION

The present invention generally relates to methods for manufacturing composite laminate articles and, more particularly, to methods for applying pressure to composite laminate areas that are masked by secondary features. Composite laminate areas masked by secondary features include the area of an uncured part, such as a skin preform, that experiences reduced pressure during co-curing/co-bonding processes due to the presence of a secondary feature, such as a precured frame web.

Composite laminate materials are known in the art. They are used extensively in the manufacturing of aircraft and other lightweight structures. They have a high strength-to-weight ratio and high stiffness. As is known in the art, a plurality of plies of uncured fiber reinforced organic matrix prepregs may be placed on a shaping tool. The prepregs may then be cured using known methods, such as vacuum bag processes, to produce the desired cured structure. Dry fiber preforms are also known in the art and have also been used to produce composite structures.

Vacuum bag processes may comprise covering the prepregs with a release material. The lay-up—comprising the prepregs, tool and release layer may then be hermetically sealed within a flexible vacuum bag. The bagged lay-up may then be evacuated to remove as much air and other volatiles as possible. After evacuation, the bagged lay-up may then be subjected to elevated temperature and/or pressure to cure the prepregs. Resin infused preforms may also be cured by known vacuum bag processes.

During curing, air and volatiles within the prepregs may be removed by vacuum. The organic resin may then flow into the areas previously occupied by the air. This process may be used to make composite laminate structures, but the shape and size of the structure is limited to the shape and size of the tool. Although tool shapes have advanced beyond those used to produce flat sheets, even more complex shaped structures are desired.

Two or more composite laminate structures have been joined together to form larger more complex shaped structures. Cured composite laminates have been joined together by mechanical fastening, adhesive bonding, and thermoplastic welding, such as moving coil welding and fixed coil induction welding. Although these joining methods can be used to produce complex shaped structures, they are not useful for some applications.

Other methods for producing complex shaped structures are known in the art. U.S. Pat. No. 5,817,269 describes methods for producing complex composite structures, such as wing boxes. In the described methods, two uncured parts, such as a wing skin lay-up and a rib lay-up, may be cured simultaneously. Although the disclosed methods may be used to make complex shaped articles, they require complicated tooling techniques. The described tooling techniques may not be feasible or desirable for some applications.

Co-curing/co-bonding processes have also been used to produce complex composite laminate structures. Co-curing/co-bonding processes may comprise laying up and precuring a composite part, such as an I-beam. This precured part may then be placed on an uncured lay-up, such as a wing skin lay-up. Bond clips, such as angle clips and pi ties, as known in the art, may be used to reinforce the interface between the uncured part and the precured part. The uncured lay-up together with the precured part and angle clips may then be vacuum bagged and co-cured/co-bonded. Co-curing/co-bonding processes have been used to produce wing boxes and other complex shaped structures. Unfortunately, known co-curing/co-bonding processes result in the buckling of the uncured part into the gap at the interface between the uncured part and the precured part on relatively thin structures. This buckling may cause wrinkles in the outer mold line. Additionally, for some applications, the known processes result in an undesirable amount of un-reinforced resin at the interface or a low fiber volume within the laminate. Un-reinforced resin or high resin volume laminate reduces the structural integrity of the finished product and has a tendency to microcrack.

As can be seen, there is a need for improved methods for producing complex shaped composite structures. Also, there is a need for a method of eliminating the buckling or wrinkling of uncured laminate during co-cure/co-bond processes. Further, there is a need for a method of reducing the volume of un-reinforced resin between two co-cured/co-bonded parts.

SUMMARY OF THE INVENTION

In one aspect of the present invention, a method of making a composite article comprises the steps of: positioning a pressure augmentation strip in contact with an area of the article masked by a precured secondary feature; positioning one pressure transfer wedge on each of two sides of the secondary feature, such that the pressure transfer wedge is capable of transferring a vacuum pressure to the pressure augmentation strip; and co-curing/co-bonding the composite article and the secondary feature.

In another aspect of the present invention, a method for applying pressure to an area of an uncured part masked by a precured part comprises the steps of providing a pressure augmentation strip and a sine wave spring; preparing the pressure augmentation strip and the sine wave spring for bonding; installing the pressure augmentation strip and the sine wave spring, such that the pressure augmentation strip is in contact with the area, and such that the sine wave spring is between the pressure augmentation strip and the precured part; injecting a structural paste adhesive between the pressure augmentation strip and the precured part; curing the structural paste adhesive; and co-curing/co-bonding the uncured part and the precured part.

In another still another aspect of the present invention, a method for applying pressure to an area of an uncured aircraft skin preform masked by a precured frame web or other composite component comprises the steps of: providing a prepared pressure augmentation strip and a prepared sine wave spring; placing the prepared pressure augmentation strip in contact with the area; positioning the prepared sine wave spring between the prepared pressure augmentation strip and the precured frame web, whereby a plurality of wave voids are produced; injecting a structural paste adhesive into the wave voids; curing the structural paste adhesive; and co-curing/co-bonding the uncured aircraft skin preform and the precured frame web.

In yet another aspect of the present invention, a method for applying pressure to an area of a composite laminate masked by a secondary feature that is too thin to implement the use of the sine wave spring, comprises the steps of: providing a pressure augmentation strip; preparing the pressure augmentation strip for bonding; installing the pressure augmentation strip, such that the pressure augmentation strip is in contact with the area; securing a pressure transfer wedge on each of two sides of the secondary feature, such that each pressure transfer wedge is capable of transferring a vacuum pressure to the pressure augmentation strip; and co-curing/co-bonding the composite laminate and the secondary feature.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides a method for applying pressure to composite laminate areas masked by secondary features. The method of the present invention may be used, for example, for applying pressure to the area of an uncured skin preform that is masked by a precured frame web. The method of the present invention may find beneficial use in many industries including aerospace and aircraft manufacturing. The present invention may be useful in the manufacturing of any composite laminate article, particularly those having a complex shape. The present invention may be useful in any manufacturing process where a secondary feature, such as a precured part, masks an area of an uncured part, such as an infused preform or prepreg laminate, during co-cure/co-bond processes.

Unlike the prior art, the method of the present invention applies pressure to composite laminate areas masked by secondary features, such as precured parts. The method of the present invention, also unlike the prior art, eliminates buckling of the masked areas of preforms and prepregs. Low fiber volume areas resulting from such masking are eliminated by the present invention. Unlike the prior art, the present invention reduces the amount of un-reinforced resin that would fill the gap between a precured part, such as a frame web, and an uncured part, such as skin preform, during vacuum bag co-curing/co-bonding. The present invention may reduce the un-reinforced resin by a volume about equal to the volume of the sine wave spring 68 and the structural paste adhesive 70. The reduced volume may vary and may depend on the dimensions of the masked portion 76 and the dimensions of the masked void 67.

Figure 1A:
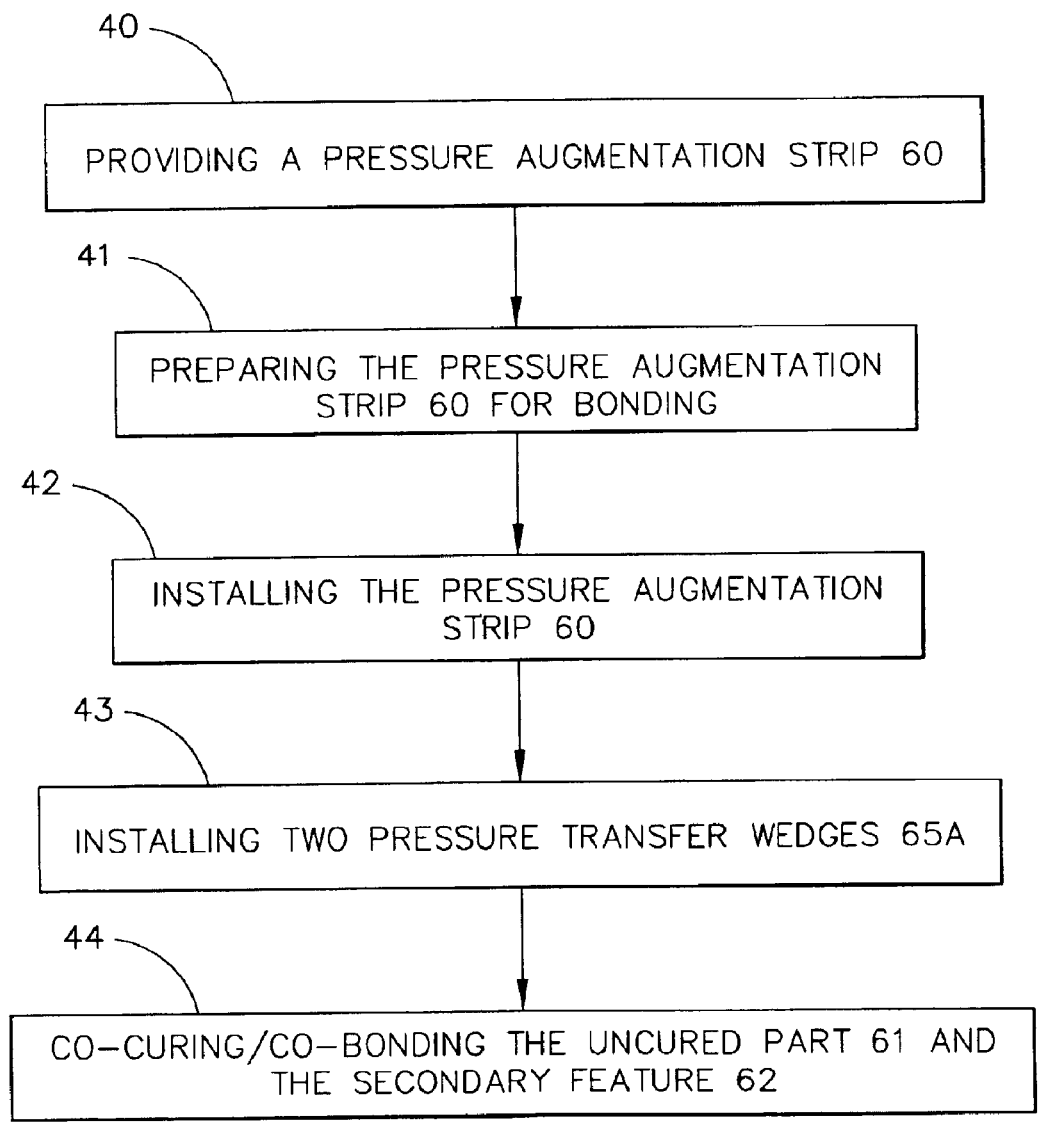
FIG. 1a is a flow chart depicting the steps of a method according to an embodiment of the present invention.

In FIG. 1a, a flow chart of the steps according to a method of the present invention is depicted. The method may comprise a step 40 of providing a pressure augmentation strip 60, a step 41 of preparing the pressure augmentation strip 60 for bonding, a step 42 of installing the pressure augmentation strip 60, a step 43 of installing two pressure transfer wedges 65a, and a step 44 of co-curing/co-bonding the uncured part 61 and the secondary feature 62.

Figure 2A:
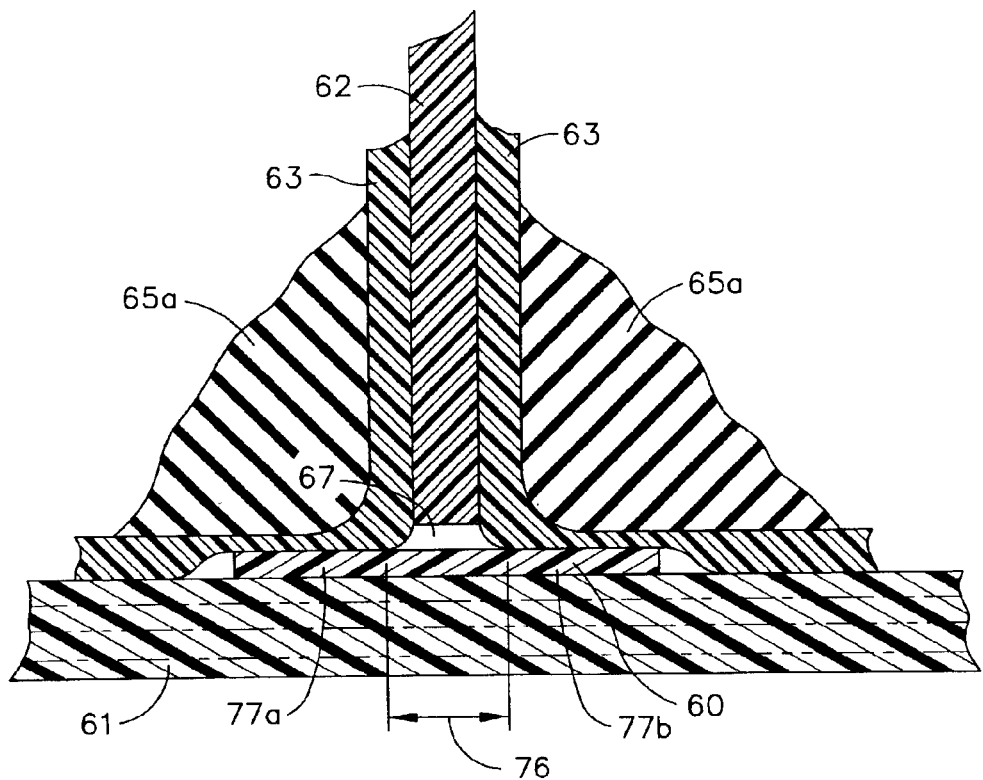
FIG. 2a is a cross sectional diagram of a composite laminate structure before co-curing/co-bonding according to an embodiment of the present invention.
Figure 2B:
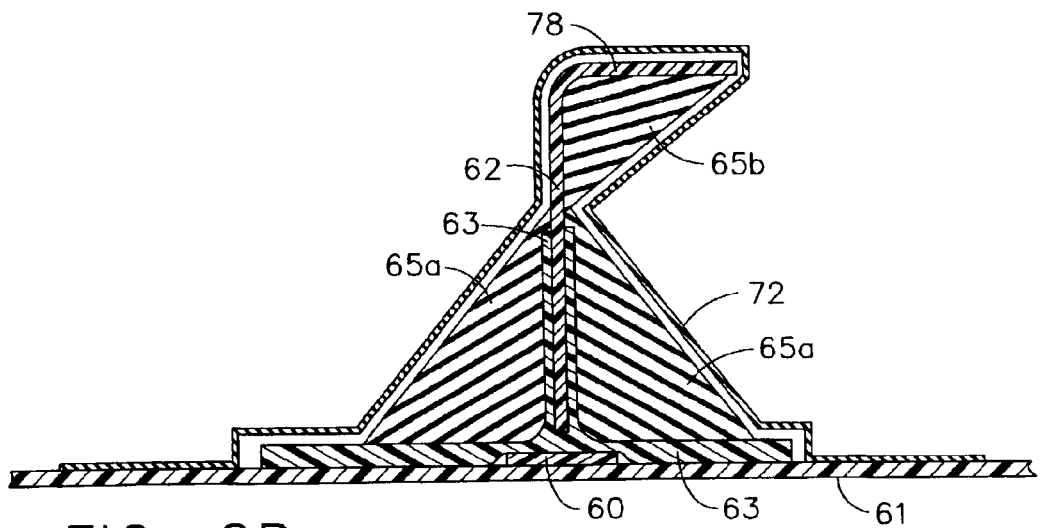
FIG. 2b is a cross sectional diagram of a composite laminate structure after co-curing/co-bonding according to an embodiment of the present invention.

The pressure augmentation strip 60, as seen in FIGS. 2a and 2b, may be a precured laminate strip. Methods for producing laminates are known in the art. Known methods may comprise vacuum bag curing of laid-up prepregs. Useful methods may include those described in U.S. Pat. Nos. 4,657,717 and 6,017,484, both of which are herein incorporated by reference. The pressure augmentation strip 60 may be produced by any known method and may comprise any known laminate materials. They may comprise, for example, a 2–4-ply carbon/epoxy laminate. The pressure augmentation strip 60 may comprise a fiberglass, Kevlar or graphite based laminate. The pressure augmentation strip 60 may comprise any thermoplastic or thermoset organic resin. The composition of a useful pressure augmentation strip 60 may depend on the composition of the uncured part 61, the composition of the secondary feature 62, and the desired application. For example, when the uncured part 61 is a dry carbon skin preform and the secondary feature 62 is a precured carbon/epoxy frame web, a useful pressure augmentation strip 60 may comprise a precured carbon/epoxy laminate. The uncured part 61 may comprise a preform or a prepreg. The secondary feature 62 may comprise a precured laminate part.

The dimensions of a useful pressure augmentation strip 60 may depend on the dimensions of the area masked by the secondary feature 62, referred to herein as a masked portion 76. The masked portion 76, as seen in FIG. 2a, is the portion of the uncured part 61 that may experience reduced pressure during co-curing/co-bonding processes due to the presence of a secondary feature 62. The width of a useful pressure augmentation strip 60 may be greater than the width of the masked portion 76. For example, when the masked portion 76 has the dimensions of four feet by one inch, the dimensions of a useful pressure augmentation strip 60 may be about four feet by about 1.5 inches. The pressure augmentation strip 60 may have a width of about 0.5 inches greater than the width of the masked portion 76. Preferred pressure augmentation strips 60 may have a width between about 0.4 inches and about 2.0 inches. Useful pressure augmentation strips 60 may have a thickness between about 0.030 inches and about 0.060 inches.

As seen in FIG. 1a, the present invention may comprise a step 41 of preparing the pressure augmentation strip 60 for bonding. Methods for preparing a laminate for bonding are known in the art. These methods may comprise abrading the laminate and washing the laminate. The pressure augmentation strip 60 may be prepared for bonding by any known method, producing a prepared pressure augmentation strip. For example, the pressure augmentation strip 60 may be abraded by sanding or sandblasting. The pressure augmentation strip 60 may then be washed in a solvent, such as acetone or Isopropyl alcohol. Any known laminate washing solvents may be useful in the present invention.

Figure 3:
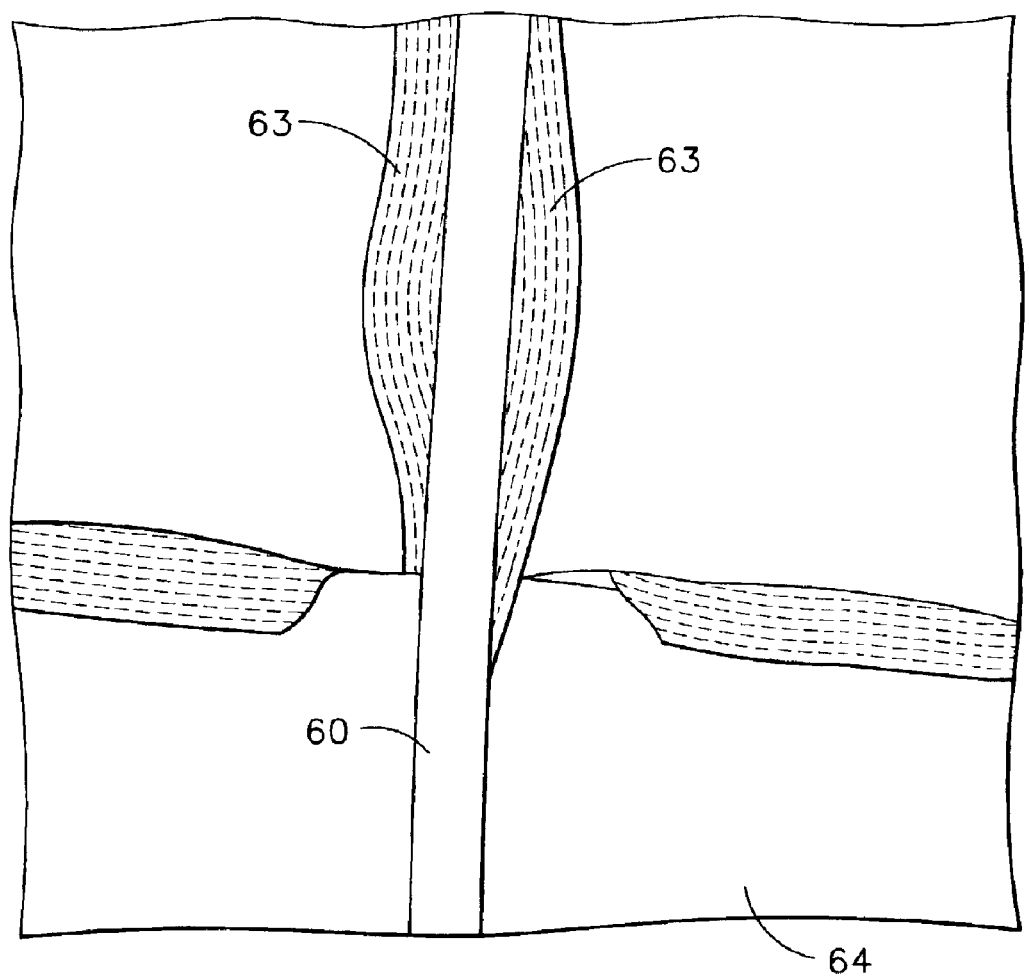
FIG. 3 is a plan view of a partially installed pressure augmentation strip according to one embodiment of the present invention.

The step 42 of installing the pressure augmentation strip 60 may comprise placing the pressure augmentation strip 60 in contact with the masked portion 76 of the uncured part 61. The pressure augmentation strip 60 may be placed such that it covers the masked portion 76 and covers an area of the uncured part 61 that is adjacent to the masked portion 76, as shown in FIG. 2a. The pressure augmentation strip 60 may be placed such that it covers two areas of the uncured part 61 on opposite sides of the masked portion 76. This is possible because the pressure augmentation strip 60 may be wider than the masked portion 76. As seen in FIG. 3, the pressure augmentation strip 60 may be placed between two bond clips 63, such as angle clips. Bond clips 63, as referred to herein, include angle clips, frame bond clips, and pi ties. In this figure, a release layer 64 covers the uncured part 61. Release layers 64 and bond clips 63 are known in the art, any of which may be useful in the present invention. The bond clips 63 may comprise uncured preform or prepreg bond clips, such as dry or impregnated graphite fabric. The release layer 64 may comprise any known release layer, such as Teflon coated fiberglass, nylon, or other standard release ply material. As better seen in FIGS. 2a and 2b, the pressure augmentation strip 60 may be positioned between the uncured part 61 and the secondary feature 62.

Figure 4:
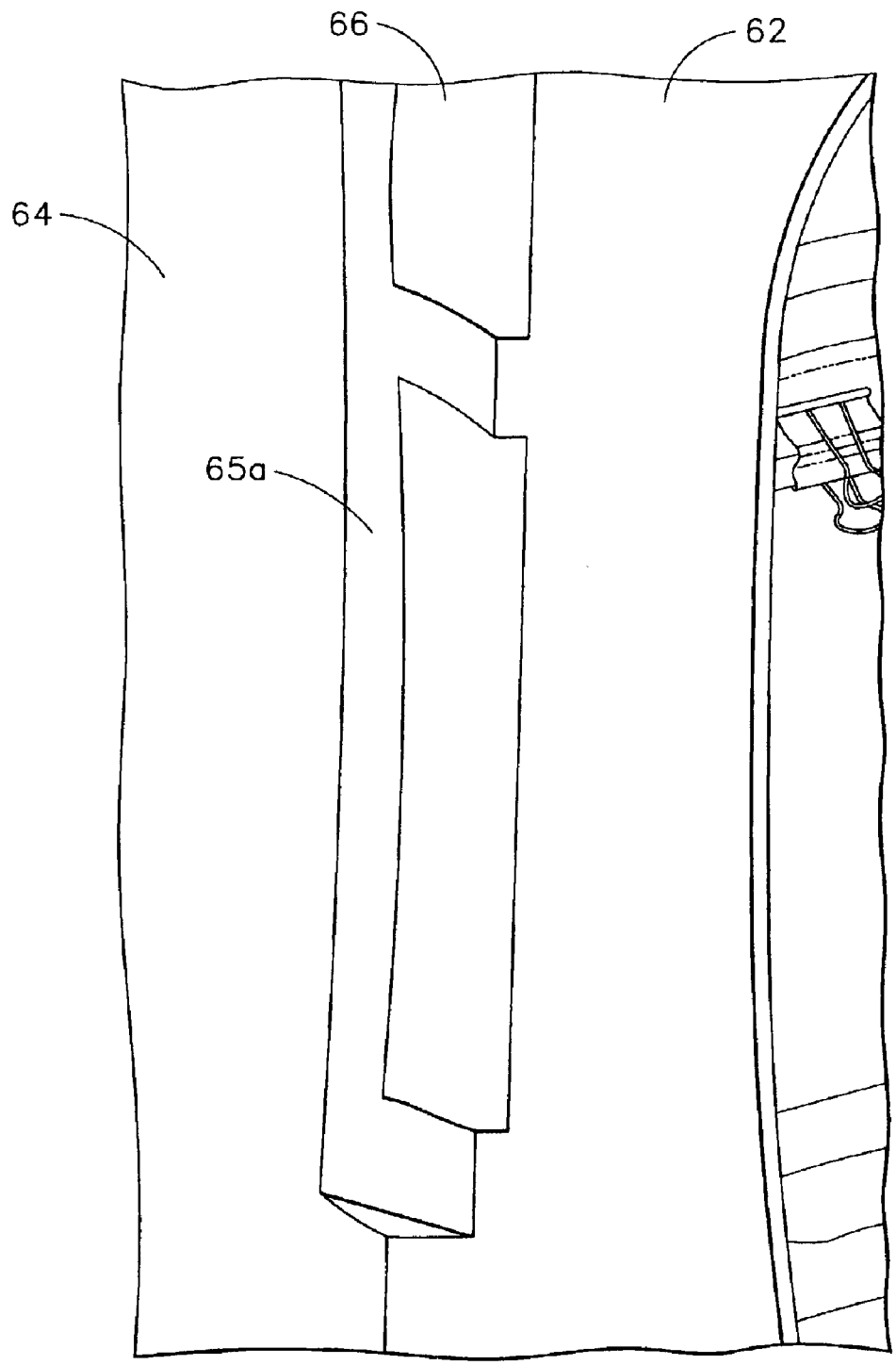
FIG. 4 is a perspective view of an installed pressure transfer wedge according to an embodiment of the present invention.

The step 43 of installing two pressure transfer wedges 65a may comprise placing the pressure transfer wedges 65a in the desired areas and securing the pressure transfer wedges 65a with an adhesive tape 66, as seen in FIG. 4. Pressure transfer wedges 65a are known in the art and may comprise the elastomer pressure intensifiers used in vacuum bag processes. As better seen in FIG. 2a, the pressure transfer wedges 65a may be placed such that they are capable of transferring pressure to the pressure augmentation strip 60 during the step 44 of co-curing/co-bonding. One edge area 77a of a pressure augmentation strip 60 may be between an uncured part 61 and a pressure transfer wedge 65a. Another edge area 77b of the pressure augmentation strip 60 may be between the uncured part 61 and a second pressure transfer wedge 65a, as seen in FIG. 2a. In this figure, one bond clip 63 is also between each pressure transfer wedge 65a and edge area 77a, b. The pressure augmentation strip 60 may be in contact with the uncured part 61 and two bond clips 63. As shown in FIG. 2b, additional pressure transfer wedges 65b may be used during the step 44 of co-curing/co-bonding. The additional wedges 65b may be used to apply transfer pressure to other areas 78 of the secondary feature 62, as is known in the art.

The step 44 of co-curing/co-bonding may comprise vacuum bag processes and autoclave processes. A portion of a vacuum bag 72 is shown in FIG. 2b. As can be seen, portions of the bond clips 63 may be pulled into a masked void 67 and may fill the masked void 67 during the step 44 of co-curing/co-bonding. The masked void 67 is the gap between the secondary feature 62 and the masked portion 76.

Vacuum processes used in co-curing/co-bonding may cause voids, such as masked voids 67, to be filled by adjacent uncured composites, such as uncured parts 61 and bond clips 63. During co-curing/co-bonding processes using prior art methods, portions of the uncured part 61 are pulled into the masked void 67, resulting in skin buckling. When using the method depicted in FIG. 1a, portions of the bond clip 63 may fill the masked void 67. Using the method of the present invention, the uncured part 61 may be prevented from buckling into the masked void 67 during co-curing/co-bonding. This prevention may be due to the presence of the pressure augmentation strip 60 and the pressure transfer wedges 65a. During co-curing/co-bonding, a vacuum pressure may be transferred from the pressure transfer wedge 65a to the pressure augmentation strip 60. This vacuum pressure may then be transferred to the uncured part 61, thereby preventing the masked portion 76 from buckling. Using the known process of filling the gap between the cured part and the uncured skin with a "noodle" of uncured or dry fiber can further reduce the occurrence of voids but is extremely tedious when the precured part is thin. With the pressure augmentation strip 60 in place, the "noodle can more easily be inserted.

Figure 1B:
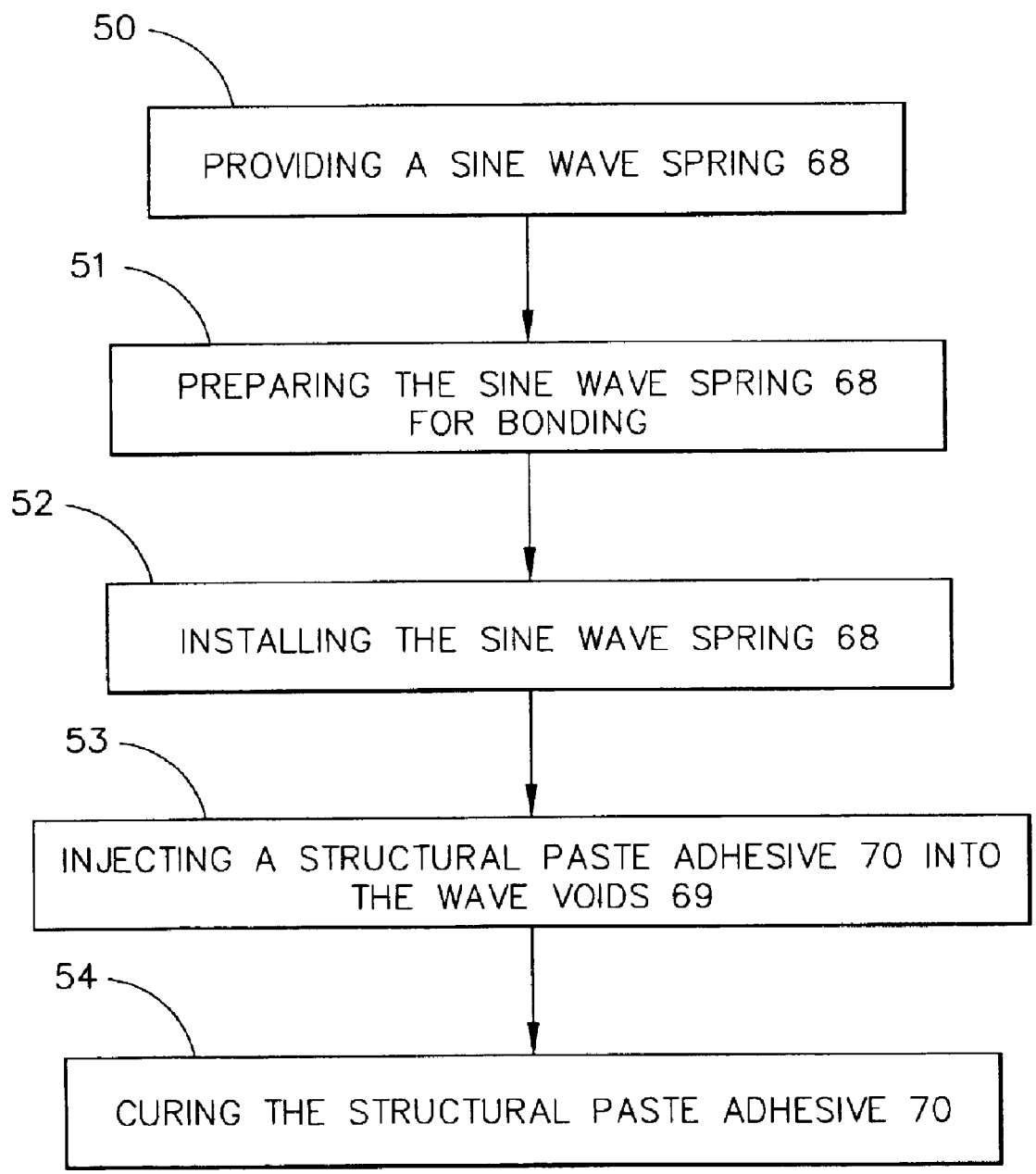
FIG. 1b is a flowchart depicting optional steps of a method according to an embodiment of the present invention.

For some applications, the method of the present invention can optionally comprise the additional steps depicted in FIG. 1b. These applications may include, for example, situations wherein the secondary feature 62 has a width between about 0.15 inches and about 0.5 inches. The steps depicted in FIG. 1b may be useful for any application wherein the secondary feature 62 has a width of at least about 0.150 inches.

A method of the present invention may further comprise a step 50 of providing a sine wave spring 68; a step 51 of preparing the sine wave spring 68 for bonding; a step 52 of installing the sine wave spring 68, whereby a plurality of wave voids 69 are produced; a step 53 of injecting a structural paste adhesive 70 into the wave voids 69; and a step 54 of curing the structural paste adhesive 70.

Figure 5:
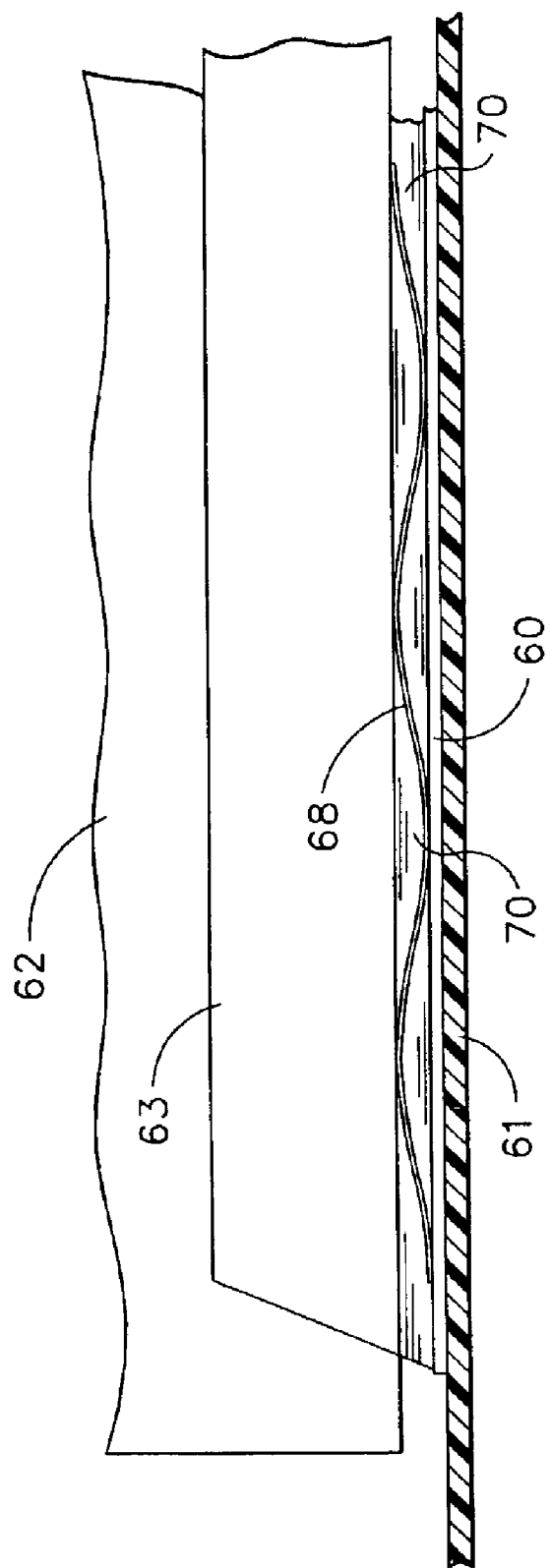
FIG. 5 is a cross sectional diagram of a composite laminate structure according to an embodiment of the present invention.

The sine wave spring 68 of step 50 is shown in FIG. 5. The sine wave spring 68 may comprise a precured laminate. The sine wave spring 68 may be produced by known laminate forming processes. Laminate prepregs may be laid-up on a sine wave shaped tool and cured to form a sine wave spring 68. As with the pressure augmentation strip 60, the composition of the sine wave spring 68 may vary depending on the application. The sine wave spring 68 may comprise a compatible composite. For example, when the secondary feature 62 comprises carbon/epoxy, the sine wave spring 68 may comprise carbon/epoxy. The dimensions of the sine wave spring 68 may depend on the dimensions of the masked portion 76 and the dimensions of the masked void 67. The width of the sine wave spring 68 may be about equal to the width of the masked portion 76. Useful sine wave springs 68 may have a width between about 0.150 inches and about 0.5 inches. The sine wave spring 68 may fit within the masked void 67.

The step 51 of preparing the sine wave spring 68 for bonding may comprise the same methods of abrading and washing as used in step 41 for preparing the pressure augmentation strip 60 for bonding. The step 51 may produce a prepared sine wave spring. The sine wave spring 68 may be installed after it has been prepared for bonding.

Figure 6:
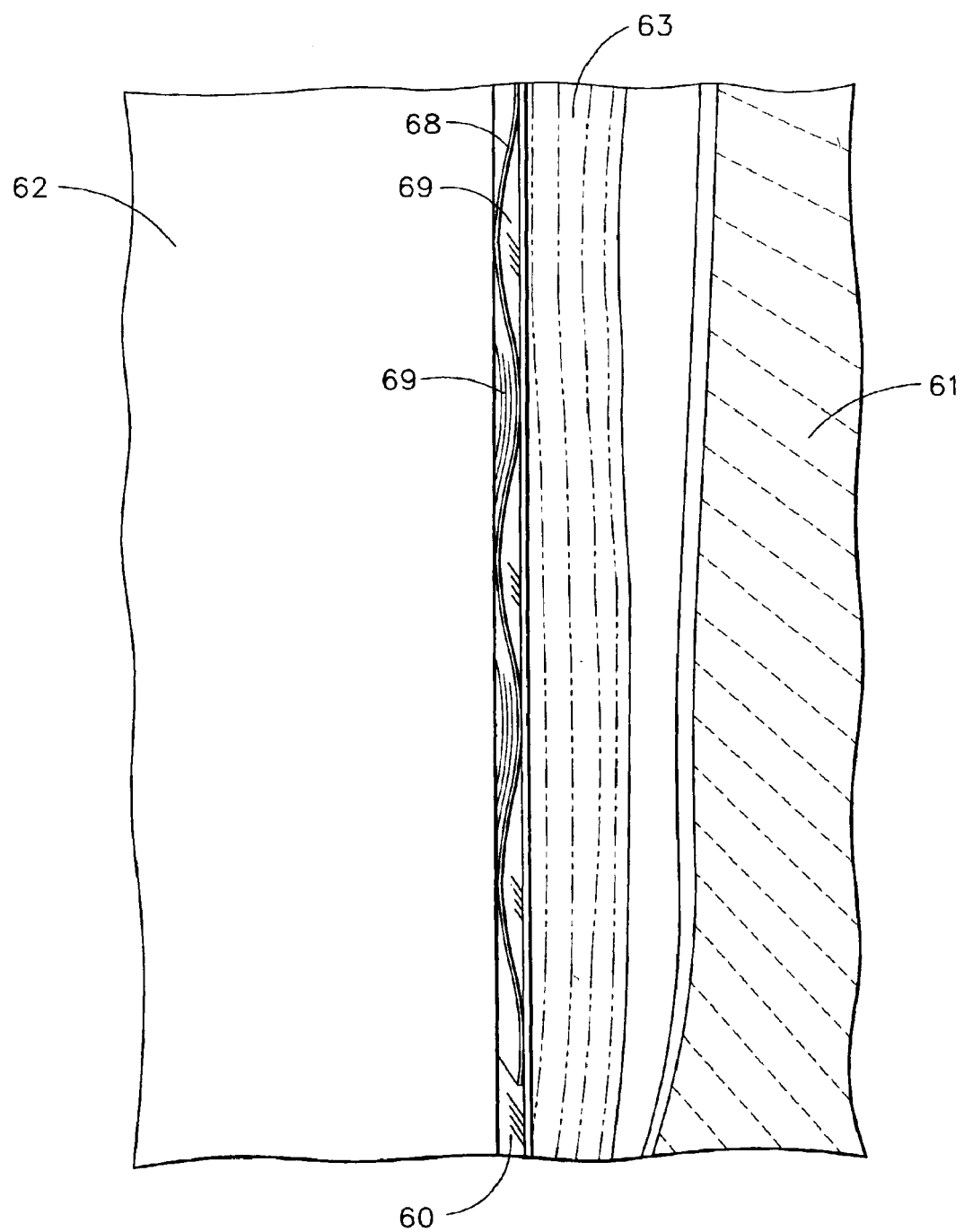
FIG. 6 is a plan view of an installed sine wave spring according to an embodiment of the present invention.

The step 52 of installing the sine wave spring 68 may comprise positioning the sine wave spring 68 between the pressure augmentation strip 60 and the precured secondary feature 62, as shown in FIGS. 5 and 6. The sine wave spring 68 may be installed such that it is within the masked void 67. The sine wave spring 68 may be in contact with the secondary feature 62 and the pressure augmentation strip 60, as shown in FIG. 6. In this figure, the bond clip 63 has been folded to reveal the sine wave spring 68.

Figure 7:
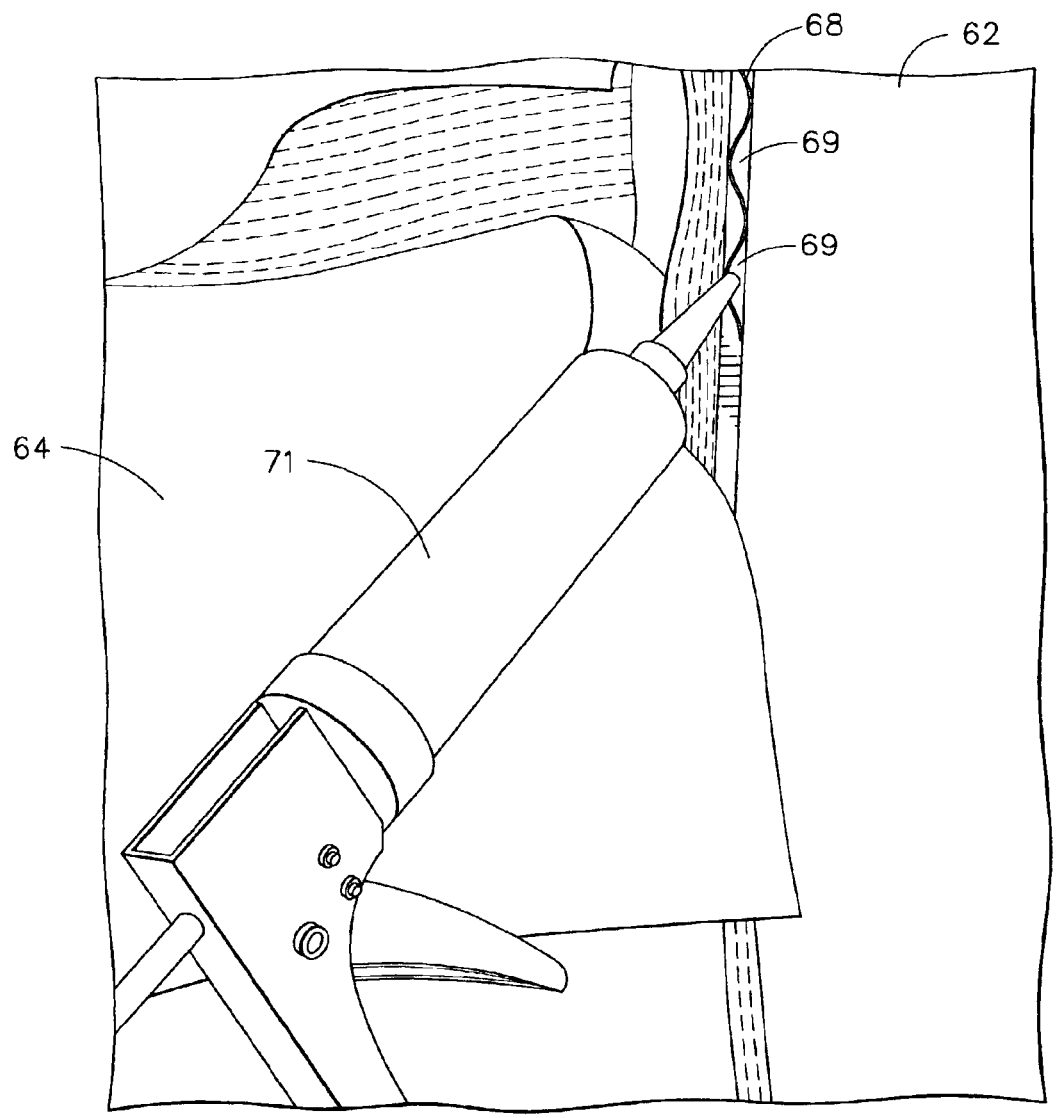
FIG. 7 is perspective view of a structural paste adhesive being injected into a plurality of wave voids according to an embodiment of the present invention.

The step 53 of injecting a structural paste adhesive 70 into the wave voids 69 is shown in FIG. 7. The wave voids 69 may be the voids defined by the sine wave spring 68, as shown in FIG. 6. As seen in FIG. 5, the structural paste adhesive 70 may surround the sine wave spring 68. Methods for injecting a structural paste adhesive 70 are known in the art, all of which may be useful in the present invention. As shown in FIG. 7, an injector device 71 may be useful. The composition of the structural paste adhesive 70 may vary depending on the application. All known structural paste adhesives 70 may be useful. Useful structural pastes adhesives 70 may include structural epoxy adhesive and acrylic adhesive.

The step 54 of curing the structural paste adhesive 70 may comprise any known method for curing a structural paste adhesive 70. A useful method may depend on the composition of the structural paste adhesive 70. For example, when the structural paste adhesive 70 is a structural epoxy adhesive, the step 54 may comprise curing at room temperature until fully gelled. The structural paste adhesive 70 may be cured prior to the step 44 of co-curing/co-bonding. When the uncured part 61 is a preform, preform resin infusion may occur after the structural paste adhesive 70 has been cured. Preform resin infusion is known in the art and comprises infusing the preform with a polymer resin.

After the structural paste adhesive 70 has been cured, the method may comprise a step 44 of co-curing/co-bonding. Vacuum processes used in co-curing/co-bonding may cause voids, such as masked voids 67, to be filled by un-reinforced resin from the adjacent uncured composites, such as uncured parts 61 and bond clips 63. During co-curing/co-bonding processes of prior art methods, this may result in structures with an unacceptable volume of un-reinforced resin at the interface between the two co-cured/co-bonded parts. Using the method of the present, the un-reinforced resin volume may be reduced by 80–90%. The sine wave spring 68 and the structural paste adhesive 70 may be within the masked void 67. The presence of the sine wave spring 68 and structural paste adhesive 70 may reduce the volume of the masked void 67 that is capable of receiving laminate resin during co-curing/co-bonding processes. When the volume of the masked void 67 is reduced, the volume of un-reinforced resin in the finished product may be equally reduced. Cured structural paste adhesive 70 may be stronger and less prone to microcracking than un-reinforced resin. The method of the present invention can be used to produce improved structures.

An alternative embodiment of the present invention may comprise steps 40–42, a step 44, and steps 50–54. A step 43 of installing two pressure transfer wedges may not be necessary in some applications. The presence of the sine wave spring 68 and structural paste adhesive 70 may provide sufficient pressure to the pressure augmentation strip 60 during co-curing/co-bonding processes, thereby making the pressure transfer wedges 65a unnecessary in some applications. A further embodiment of the present invention may comprise the use of the pressure augmentation strip 60 without the sine wave spring 68. The sine wave spring 68 may be used only where the secondary features 62, such as frames, meet or exceed 0.15 inches thick in the web area. The majority of the fuselage frames may be much thinner so only the pressure augmentation strips 60 may be used.

EXAMPLE 1

Figure 8:
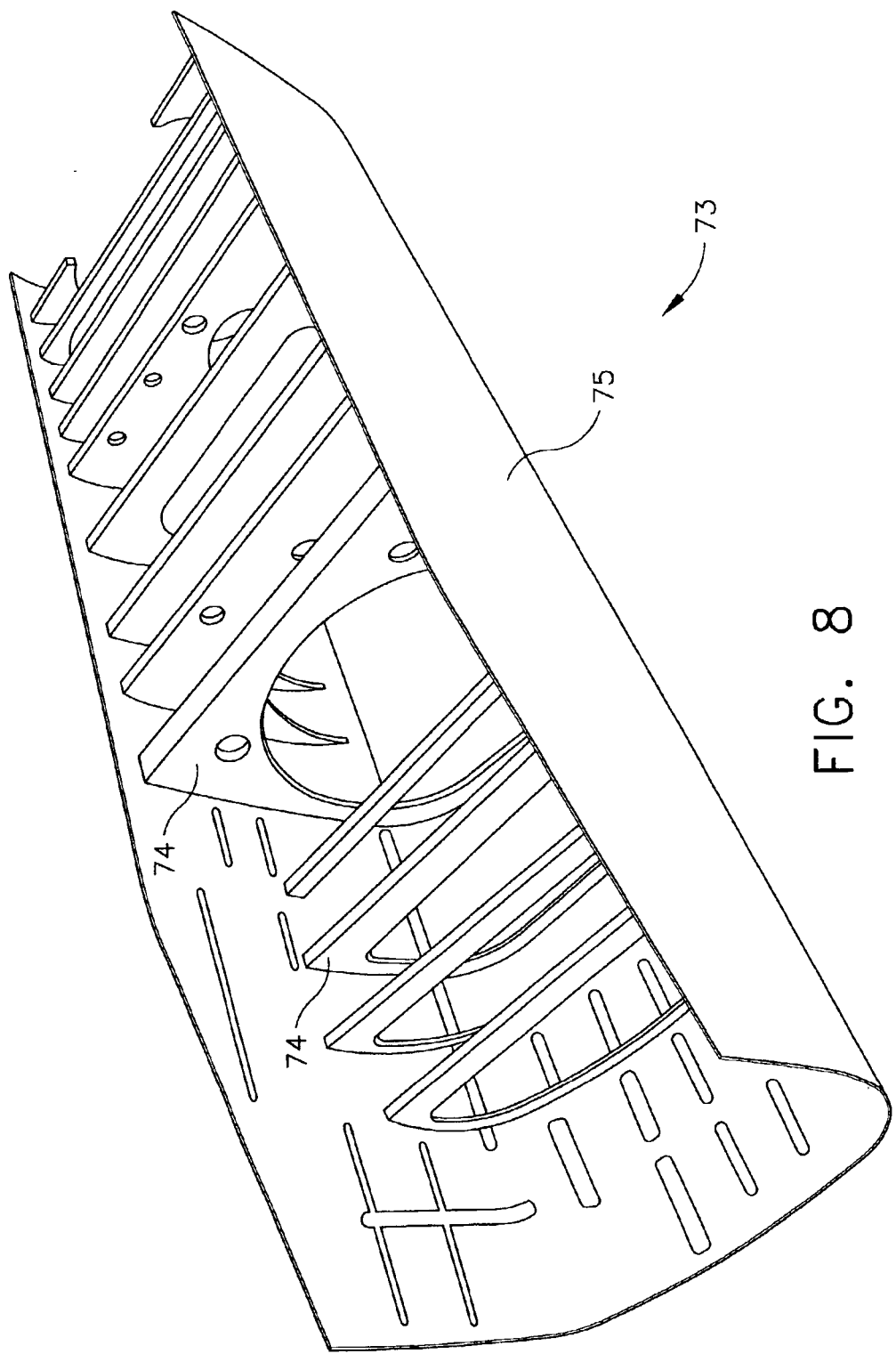
FIG. 8 is a perspective view of a rotary wing fuselage structure produced according to an embodiment of the present invention.

A rotary wing fuselage structure 73, as shown in FIG. 8, was constructed using the method of the present invention. Each of twenty-six pressure augmentation strips 60 (thirteen to a side, split at the middle for ease of installation) was placed between two frame bond clips and in contact with a fuselage skin 75. The fuselage skin 75 was comprised of dry fabrics stitched together as a preform. The frame bond clips were comprised of dry fabrics stitched together and stitched to the fuselage skin 75. The pressure augmentation strips 60 were comprised of 2–4 ply carbon/epoxy precured laminate and had dimensions varying from 0.5" wide to 0.8" wide. Each of six sine wave springs 68 was positioned between one pressure augmentation strip 60 and one thick fuselage frame member 74. The fuselage frame members 74 were comprised of precured carbon/epoxy laminates. The thin fuselage frame members 74 and thin areas on the heavy fuselage frame members 74 did not require sine wave springs 68 nor could they be used due to the thin (less than 0.150" thick) frame laminate. The use of the sine wave spring 68 within the rotary wing fuselage structure 73 was limited to six locations, about nine inches long each in thick areas of three frame members 74. The balance of the frame members 74 used only the pressure augmentation strips 60 and the elastomer wedges. Structural paste adhesive 70 was not used where the frame members 74 were less than 0.150" thick and no sine wave spring 68 was installed. The sine wave springs were comprised of 2–4 ply carbon/epoxy precured laminate and had the dimensions of 0.25" to 0.35" wide by 8 inches to 9 inches long. An epoxy structural adhesive was injected into the areas around the sine wave springs 68 and then cured at room temperature per manufacturer's Instructions. The fuselage skin 75 and the fuselage frame members 74 were then co-cured/co-bonded by placing in an oven and running a cure per resin manufacturer's recommendations. The rotary wing fuselage structure 73 was fourteen feet long, four feet wide, and four feet deep. The fuselage skin 75 did not buckle during co-curing/co-bonding.

As can be appreciated by those skilled in the art, the present invention provides improved methods for composite manufacturing. A method for applying pressure to an area masked by a secondary feature is also provided. Additionally, methods are provided for eliminating the buckling of aircraft skin composites. Further, a method for reducing the amount of un-reinforced resin in a composite structure is provided.

It should be understood, of course, that the foregoing relates to preferred embodiments of the invention and that modifications may be made without departing from the spirit and scope of the invention as set forth in the following claims.

We claim:

1. A method for making a composite article, comprising the steps of:
    positioning a pressure augmentation strip in contact with an area of said article that is masked by a secondary feature;
    positioning a sine wave spring between said pressure augmentation strip and said secondary feature, whereby a plurality of wave voids are produced;
    positioning one pressure transfer wedge on each of two sides of said secondary feature, such that said pressure transfer wedge is capable of transferring pressure to said pressure augmentation strip; and
    co-curing/co-bonding said composite article and said secondary feature.

2. The method of claim 1, wherein said composite article comprises an uncured preform.

3. The method of claim 1, wherein said composite article comprises an uncured prepreg.

4. The method of claim 1, wherein said pressure augmentation strip comprises a precured composite laminate.

5. The method of claim 1, wherein said pressure augmentation strip comprises an abraded and solvent washed laminate.

6. The method of claim 1, wherein said secondary feature comprises a precured composite laminate.

7. The method of claim 1, wherein said sine wave spring comprises a precured composite laminate.

8. The method of claim 1, further comprising:
    injecting a structural paste adhesive into said wave voids; and
    curing said structural paste adhesive.

9. The method of claim 8, wherein said structural paste adhesive is selected from the group consisting of structural epoxy adhesive and acrylic adhesive.

10. A method for making a composite article having an area of an uncured part masked by a precured part, comprising the steps of:
    providing a pressure augmentation strip and a sine wave spring;
    preparing said pressure augmentation strip and said sine wave spring for bonding;
    installing said pressure augmentation strip and said sine wave spring, such that said pressure augmentation strip is in contact with said area, and such that said sine wave spring is between said pressure augmentation strip and said precured part;
    injecting a structural paste adhesive between said pressure augmentation strip and said precured part;
    curing said structural paste adhesive; and
    co-curing/co-bonding said uncured part and said precured part.

11. The method of claim 10, wherein said uncured part comprises an uncured aircraft skin preform.

12. The method of claim 10, wherein said precured part comprises a precured frame web.

13. The method of claim 10, wherein said sine wave spring comprises a precured composite laminate.

14. The method of claim 10, wherein said pressure augmentation strip comprises a carbon/epoxy laminate.

15. The method of claim 10, wherein said step of co-curing/co-bonding comprises vacuum bag co-curing/co-bonding.

16. The method of claim 10, wherein said uncured part comprises an uncured prepreg.

17. A method for applying pressure to an area of an uncured aircraft skin preform masked by a precured frame web, comprising the steps of:
    providing a prepared pressure augmentation strip and a prepared sine wave spring;
    placing said prepared pressure augmentation strip in contact with said area;
    positioning said prepared sine wave spring between said prepared pressure augmentation strip and said precured frame web, whereby a plurality of wave voids are produced;
    injecting a structural paste adhesive into said wave voids;
    curing said structural paste adhesive; and
    co-curing/co-bonding said uncured aircraft skin preform and said precured frame web.

18. The method of claim 17, wherein said prepared pressure augmentation strip comprises a carbon/epoxy laminate.

19. The method of claim 17, wherein said structural paste adhesive is selected from the group consisting of structural epoxy adhesive and acrylic adhesive.

20. The method of claim 17, further comprising a step of securing at least one frame bond clip to a surface of said uncured aircraft skin preform.

21. The method of claim 17, wherein said prepared pressure augmentation strip has a width between about 0.4 inches and about 2.0 inches.

22. The method of claim 17, wherein said prepared sine wave spring has a width between about 0.15 inches and about 0.5 inches.

23. The method of claim 17, further comprising a step of positioning one pressure transfer wedge on each of two sides of said precured frame web, such that each said pressure transfer wedge is capable of transferring a vacuum pressure to said prepared pressure augmentation strip.

24. A method for applying pressure to an area of a composite laminate masked by a secondary feature comprising the steps of:
providing a pressure augmentation strip;
preparing said pressure augmentation strip for bonding;
installing said pressure augmentation strip, such that said pressure augmentation strip is in contact with said area;
securing a pressure transfer wedge on each of two sides of said secondary feature, such that each said pressure transfer wedge is capable of transferring a vacuum pressure to said pressure augmentation strip;
co-curing/co-bonding said composite laminate and said secondary feature;
providing a sine wave spring;
preparing said sine wave spring for bonding;
positioning said sine wave spring between said pressure augmentation strip and said secondary feature, whereby at least one wave void is produced;
injecting a structural paste adhesive into said wave void; and
curing said structural paste adhesive.

25. The method of claim 24, wherein said composite laminate comprises an uncured preform.

26. The method of claim 24, wherein said composite laminate comprises an uncured prepreg.

27. The method of claim 24, wherein said pressure augmentation strip comprises a precured composite laminate.

28. The method of claim 24, wherein said pressure augmentation strip has a thickness between about 0.030 inches and about 0.060 inches.

29. The method of claim 24, wherein said co-curing/co-bonding comprises vacuum bag co-curing/co-bonding.

30. A method for applying pressure to an area of a composite article masked by a secondary feature comprising the steps of:
positioning a prepared pressure augmentation strip in contact with said area, wherein said prepared pressure augmentation strip comprises a prepared carbon/epoxy laminate;
positioning a prepared sine wave spring between said prepared pressure augmentation strip and said secondary feature, whereby a plurality of wave voids are produced;
injecting a structural paste adhesive into said wave voids, wherein said structural paste adhesive is selected from the group consisting of structural epoxy adhesive and acrylic adhesive;
curing said structural paste adhesive;
positioning one pressure transfer wedge on each of two sides of said secondary feature, such that said pressure transfer wedge is capable of transferring a vacuum pressure to said pressure augmentation strip; and
co-curing/co-bonding said composite article and said secondary feature.

31. A method for making a composite article, comprising the steps of:
positioning a pressure augmentation strip in contact with an area of said article that is masked by a secondary feature;
positioning a sine wave spring between said pressure augmentation strip and said secondary feature, whereby a plurality of wave voids are produced;
applying pressure on each of two sides of said secondary feature, such that said pressure is transferred to said pressure augmentation strip; and
co-curing/co-bonding said composite article and said secondary feature.

* * * * *